(12) United States Patent
Nakazono

(10) Patent No.: US 8,471,543 B2
(45) Date of Patent: Jun. 25, 2013

(54) DC-DC CONVERTER WITH SLOPE COMPENSATION CIRCUIT AND DC VOLTAGE CONVERSION METHOD THEREOF

(75) Inventor: Koichi Nakazono, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 280 days.

(21) Appl. No.: 12/939,580

(22) Filed: Nov. 4, 2010

(65) Prior Publication Data

US 2011/0101932 A1 May 5, 2011

(30) Foreign Application Priority Data

Nov. 5, 2009 (JP) ................................. 2009-253816

(51) Int. Cl.
G05F 1/00 (2006.01)
(52) U.S. Cl.
USPC ........................................................ 323/283
(58) Field of Classification Search
USPC .......................................... 323/241, 282–283
See application file for complete search history.

(56) References Cited

U.S. PATENT DOCUMENTS

| 7,230,406 B2 * | 6/2007 | Huang et al. ................... 323/222 |
| 2006/0043957 A1 * | 3/2006 | Carvalho ....................... 323/313 |
| 2006/0284607 A1 * | 12/2006 | Isobe ............................. 323/282 |
| 2007/0132435 A1 * | 6/2007 | Hasegawa et al. ............. 323/222 |
| 2008/0116872 A1 * | 5/2008 | Nakazono ...................... 323/284 |
| 2009/0184699 A1 * | 7/2009 | Natsume et al. ............... 323/282 |
| 2009/0309557 A1 * | 12/2009 | Miyamae ....................... 323/234 |

FOREIGN PATENT DOCUMENTS

JP 2006-33958 A 2/2006

* cited by examiner

Primary Examiner — Adolf Berhane
Assistant Examiner — Jeffrey Gblende
(74) Attorney, Agent, or Firm — Sughrue Mion, PLLC

(57) ABSTRACT

It is desired to provide a DC-DC converter realizing proper slope compensation when an output voltage is dynamically changed with low power consumption, high efficiency and stable operation. Such DC-DC converter includes: a circuit converting an input voltage being switched in response to a drive signal to an output voltage; an amplifier generating an error signal based on an error between a target output voltage and the output voltage; a comparator generating a PWM signal based on the error signal, a current feedback signal corresponding to a current value between the input and output, and a slope compensation signal of a current value between the input and output; a circuit generating the drive signal based on the PWM signal and a period signal; a register recording a set voltage value corresponding to the target output voltage; and a circuit generating the slope compensation signal corresponding to the set voltage value.

6 Claims, 4 Drawing Sheets

Fig. 3

| VREF[6:0] | | | | | | | output voltage[V] | SLOPE COMPENSATION AMOUNT |
|---|---|---|---|---|---|---|---|---|
| D6 | D5 | D4 | D3 | D2 | D1 | D0 | | |
| 0 | 0 | 0 | 0 | 0 | 0 | 0 | 1.3000 | 1 |
| 0 | 0 | 0 | 0 | 0 | 0 | 1 | 1.2875 | 1 |
| 0 | 0 | 0 | 0 | 0 | 1 | 0 | 1.2750 | 1 |
| . | . | . | . | . | . | . | . | . |
| 0 | 0 | 1 | 1 | 1 | 1 | 1 | 0.9125 | 1 |
| 0 | 1 | 0 | 0 | 0 | 0 | 0 | 0.9000 | 9/13 |
| 0 | 1 | 0 | 0 | 0 | 0 | 1 | 0.8875 | 9/13 |
| . | . | . | . | . | . | . | . | . |
| 1 | 0 | 0 | 0 | 0 | 0 | 0 | 0.5000 | 5/13 |
| . | . | . | . | . | . | . | . | . |

DC-DC CONVERTER WITH SLOPE COMPENSATION CIRCUIT AND DC VOLTAGE CONVERSION METHOD THEREOF

INCORPORATION BY REFERENCE

This Patent Application is based on Japanese Patent Application No. 2009-253816. The disclosure of the Japanese Patent Application is incorporated herein by reference.

BACKGROUND OF THE INVENTION

1. Field of the Invention

The present invention relates to a DC-DC converter for dynamically changing an output voltage.

2. Description of Related Art

A DC-DC converter converts a DC voltage of a certain value into a DC voltage of another value. In recent years, logic LSI (Large Scale Integration) to which DVFS (Dynamic Voltage Frequency Scaling) is applied is increasing. In DVFS, an operation frequency and a power source voltage are changed in accordance with a processing state of a processor. Therefore, the DC-DC converter for supplying an electric power to such logic LSI is required to perform dynamic switching control of an output voltage. With a current mode DC-DC converter, there is a known problem that a subharmonic oscillation is generated when a proper slope compensation is not performed. In Particular, with a DC-DC converter for dynamically changing the output voltage, there is a need for performing a proper slope compensation.

In JP2006-033958A (patent literature 1), a technique relating to a DC-DC converter is disclosed. In this technique, a proper slope compensation amount is kept in a current mode switching regulator (DC-DC converter). FIG. 1 is a diagram showing a configuration of the switching regulator in the patent literature 1. Hereinafter, the switching regulator of the patent literature 1 will be described referring to FIG. 1. In the switching regulator of the patent literature 1, a slope compensation value calculation circuit 130 is added to the configuration of a conventional switching regulator.

When a switch 107 is turned on, an input voltage VIN is stored in a coil 108. When the switch 107 is turned off, the energy stored in the coil 108 is outputted to an output capacitor 112 via a diode 109.

An error amplifier 101 amplifies the difference between: a voltage generated by dividing an output voltage VOUT by resistors 110 and 111 serving as feedback resistors; and a reference voltage VREF supplied from a reference voltage source 100.

The slope compensation value calculation circuit 130 inputs the input voltage VIN and the output voltage VOUT to output a proper slope compensation value VC to a slope compensation circuit 102. The slope compensation circuit 102 sets an increase rate of a compensation ramp wave in accordance with the output of the slope compensation value VC. The slope compensation circuit 102 generates the compensation ramp wave having a sawtooth wave shape synchronized with an output signal of an oscillator circuit 104.

An adder circuit 103 inputs the compensation ramp wave outputted from the slope compensation circuit 102 in one of input terminals thereof. The adder circuit 103 inputs a voltage obtained by converting information on a current flowing through the switch 107 or information on a current flowing through the coil 108 into a voltage value in another input terminal thereof.

A comparator 105 inputs an output signal of the error amplifier 101 in an inverting input terminal thereof. The comparator 105 inputs an output signal of the adder circuit 103 in a non-inverting input terminal thereof. An RS latch 106 inputs the output of the comparator 105 in a reset terminal R thereof. The RS latch 106 inputs an output signal of the oscillator circuit 104 in a set terminal S thereof. The oscillator circuit 104 outputs constant periodic pulses as shown in FIG. 1. An output terminal Q of the RS latch 106 is connected to the switch 107. When the output terminal Q of the RS latch 106 indicates "H" (which is the high state of a binary high/low signal), the switch 107 is turned on.

The slope compensation value calculation circuit 130 is formed by an adder and subtractor circuit including resistors 120, 121, 123 and 124, and an amplifier 122. The slope compensation value VC outputted by the slope compensation value calculation circuit 130 is expressed by the following expression (1).

$$VC = \{(R121)/(2 \times R120)\}(VOUT) - 2(VIN) \quad (1)$$

In this expression, R121 and R120 respectively denote resistance values of the resistors 121 and 120. The slope compensation value calculation circuit 130 outputs the slope compensation value VC being proportional to (VOUT−2 VIN). Thereby, a current mode step-up type switching regulator holding minimum slope compensation by which the subharmonic oscillation is not generated with any input voltage VIN or output voltage VOUT can be formed.

SUMMARY

However, in the switching regulator of the patent literature 1, there is a need for realizing the slope compensation calculation with an analogue circuit in which the output voltage is fed back. Therefore, by adding the analogue circuit, there is a disadvantage that the current consumption is increased and the efficiency is lowered. By feeding back the output voltage for the slope compensation, there is also a disadvantage that the entire system of the switching regulator is unstabilized due to the feedback loop for the slope compensation.

In an aspect of the present invention, a DC-DC converter includes: a switching circuit configured to convert an input voltage value inputted to an input and being switched in response to a drive signal to an output voltage value being outputted to an output; an error amplifier configured to generate an error signal based on an error between a target output voltage value to be outputted from the output and the output voltage value at the output; a PWM comparator configured to generate a PWM signal based on the error signal, a current feedback signal corresponding to a current value between the input and the output, and a slope compensation signal to perform a slope compensation of a current value between the input and the output; a latch circuit configured to generate the drive signal based on the PWM signal and a predetermined period signal; an output voltage set register configured to record a set voltage value corresponding to the target output voltage value; and a slope compensation circuit configured to generate the slope compensation signal having a slope compensation amount corresponding to the set voltage value.

According to another aspect of the present invention, a direct current voltage conversion method includes: converting an input voltage value inputted to an input and being switched in response to a drive signal to an output voltage value being outputted to an output; generating an error signal based on an error between a target output voltage value to be outputted from the output and the output voltage value at the output; generating a PWM signal based on the error signal, a current feedback signal corresponding to a current value between the input and the output, and a slope compensation signal to perform a slope compensation of a current value between the input and the output; generating the drive signal based on the PWM signal and a predetermined period signal; recording a set voltage value corresponding to the target output voltage value; and generating the slope compensation signal having a slope compensation amount corresponding to the set voltage value.

According to the present invention, an analogue circuit for slope calculation is not required. Therefore, a DC-DC converter capable of realizing proper slope compensation at the time of dynamically changing an output voltage with low power consumption, high efficiency and stable operation can be realized.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3 is a diagram showing a slope compensation amount corresponding to upper 2 bits of VREF [6:0] in the present embodiment.

DESCRIPTION OF THE PREFERRED EMBODIMENTS

A DC-DC converter according to some exemplary embodiments of the present invention will be described referring to the attached drawings.

[Description of Configuration]

Figure 1:
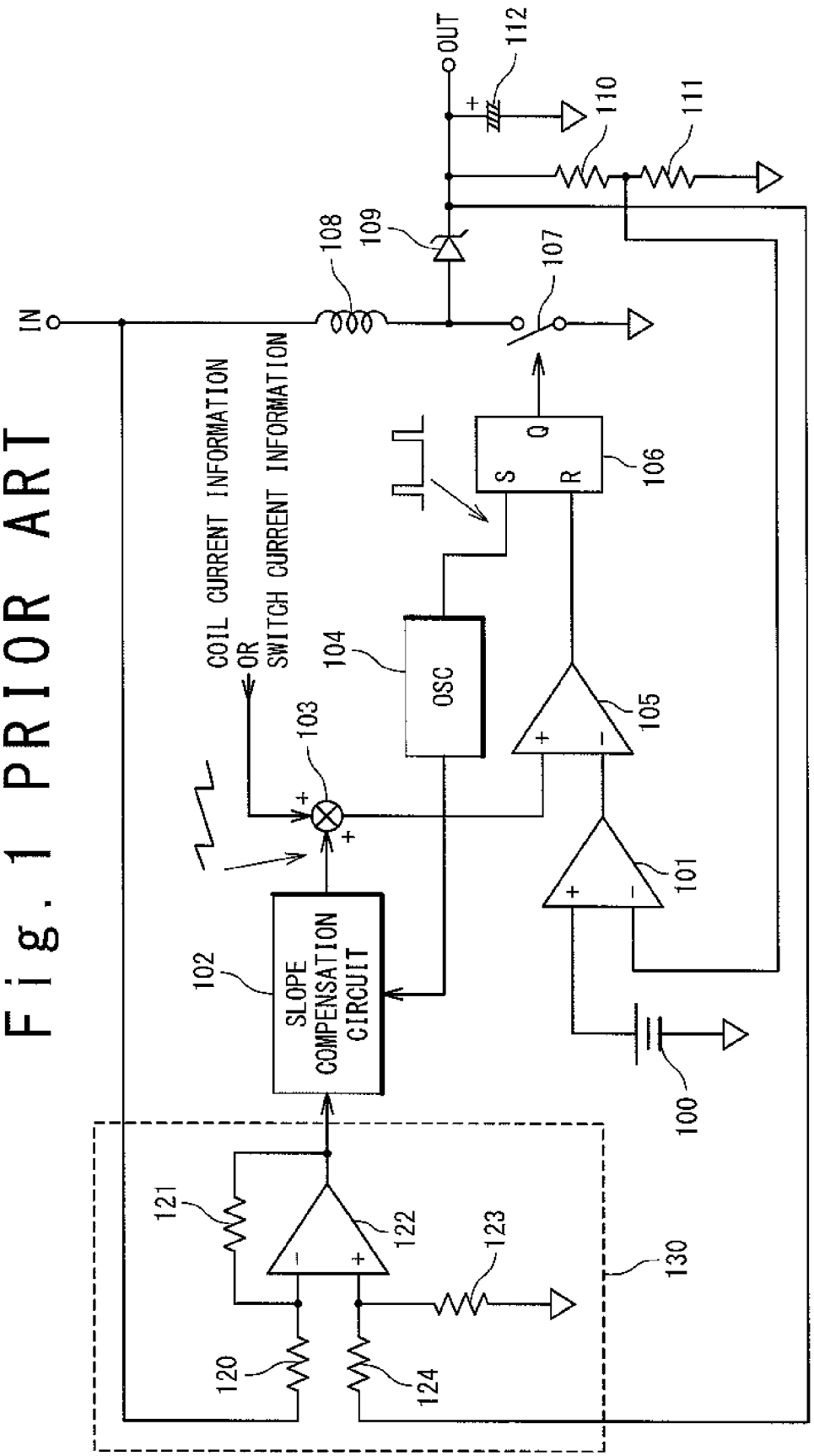
FIG. 1 is a diagram showing a configuration of a switching regulator in the patent literature 1.
Figure 2:
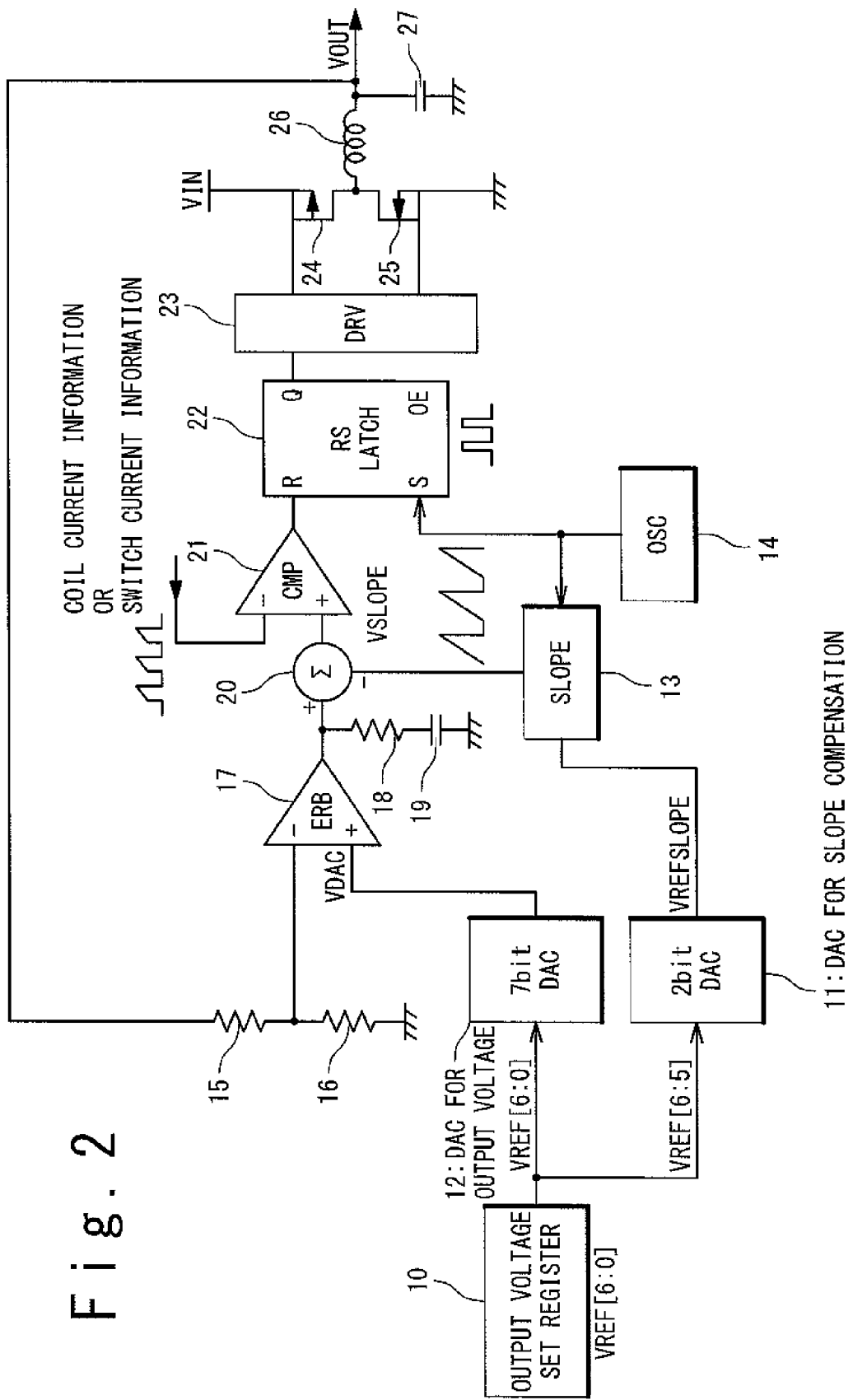
FIG. 2 is a diagram showing a configuration of a DC-DC converter in an embodiment of the present invention.

Firstly, a configuration of the DC-DC converter in the present embodiment will be described referring to FIG. 2. FIG. 2 is a diagram showing the configuration of the DC-DC converter in the present embodiment. The DC-DC converter in the present embodiment includes an output voltage set register 10, a slope compensation D/A converter (hereinafter, D/A converter is referred to as DAC) 11 being a first D/A converter, a DAC for output voltage 12 being a second D/A converter, a slope compensation circuit 13, an oscillator circuit 14, output voltage feedback resistors 15 and 16, an error amplifier 17, a phase compensation resistor 18, a phase compensation capacitor 19, a subtractor circuit 20, a PWM (pulse width modulation) comparator 21, an RS latch 22, an output power MOS driver 23, an output power PMOS 24, an output power NMOS 25, an output coil 26, and an output capacitor 27. In the following description, the output power MOS driver 23, the output power PMOS 24 and the output power NMOS 25 may be collectively called as a switching circuit.

An output of the output voltage set register 10 is connected to an input of the DAC for output voltage 12 and an input of the DAC for slope compensation 11. An output of the DAC for output voltage 12 is connected to a non-inverting input of the error amplifier 17. One end of the output voltage feedback resistor 15 is connected to the output coil 26 and the output capacitor 27. The other end of the output voltage feedback resistor 15 is connected to one end of the output voltage feedback resistor 16 and an inverting input terminal of the error amplifier 17. The other end of the output voltage feedback resistor 16 is connected to the ground. An output of the error amplifier 17 is connected to one end of the phase compensation resistor 18 and one of the inputs of the subtractor circuit 20. The other end of the phase compensation resistor 18 is connected to one end of the phase compensation capacitor 19. The other end of the phase compensation capacitor 19 is connected to the ground.

An output of the DAC for slope compensation 11 is connected to one of the inputs of the slope compensation circuit 13. The other input of the slope compensation circuit 13 is connected to an output of the oscillator circuit 14. An output of the slope compensation circuit 13 is connected to the other input of the subtractor circuit 20.

An output of the subtractor circuit 20 is connected to an inverting input terminal of the PWM comparator 21. A non-inverting input terminal of the PWM comparator 21 is connected to a detection circuit (not shown) for generating a signal obtained by converting a current value flowing between an input and an output, specifically a current value flowing through the output coil 26 or a current value flowing through the switching circuit into a voltage level. An output of the PWM comparator 21 is connected to a reset terminal R of the RS latch 22. A set terminal S of the RS latch 22 is connected to the output of the oscillator circuit 14. A non-inverting output terminal Q of the RS latch 22 is connected to an input of the output power MOS driver 23. Outputs of the output power MOS driver 23 are respectively connected to a gate terminal of the output power PMOS 24 and a gate terminal of the output power NMOS 25.

A source terminal of the output power PMOS 24 is connected to an input voltage VIN. A drain terminal of the output power PMOS 24 and a drain terminal of the output power NMOS 25 are connected to one end of the output coil 26. A source terminal of the output power NMOS 25 is connected to the ground. The other end of the output coil 26 is connected to the output capacitor 27 and a circuit (not shown) on the latter stage.

[Description of Operation]

Next, operation of the DC-DC converter in the present embodiment with the above configuration will be described. In the DC-DC converter in the present embodiment, an output voltage VOUT is changeable. In the DC-DC converter of the present embodiment, at the time of changing the output, a value of a reference voltage VREF [6:0] of the output voltage set register is changed. The DAC for output voltage 12 performs D/A conversion based on VREF [6:0] to output a reference voltage value VDAC. The error amplifier 17 amplifies the difference between VOUT divided by the output voltage feedback resistors 15 and 16 and inputted to the inverting input terminal, and the reference voltage VDAC inputted to the non-inverting input terminal, and outputs the amplified difference as an error signal.

Meanwhile, the DAC for slope compensation 11 performs the D/A conversion based on VREF [6:5] being the upper 2 bits of VREF [6:0] to output a slope compensation amount reference voltage VREFSLOPE. The slope compensation circuit 13 inputs VREFSLOPE in one of the inputs thereof. The slope compensation circuit 13 inputs a periodic signal of a predetermined frequency from the oscillator circuit 14 to the other input thereof. The slope compensation circuit 13 generates a slope compensation signal VSLOPE being a sawtooth wave in synchronization with the periodic signal from the oscillator circuit 14. Here, the slope compensation circuit 13 switches a slope compensation amount being an amplitude of VSLOPE in accordance with a value of VREFSLOPE.

The subtractor circuit 20 inputs: a error signal outputted from the error amplifier 17 and phase-compensated by the phase compensation resistor 18 and the phase compensation capacitor 19; and VSLOPE outputted from the slope compensation circuit 13. The subtractor circuit 20 outputs a signal obtained by subtracting VSLOPE from the error signal. The PWM comparator 21 inputs the output of the subtractor circuit 20 in the inverting input terminal thereof. The PWM comparator 21 inputs a signal obtained by converting a current value flowing between the input and the output, specifically a current value flowing through the output coil 26 or a current value flowing through the switching circuit into a voltage level in the non-inverting input terminal thereof. The PWM comparator 21 generates a PWMDUTY signal based on the difference between an input to the inverting input terminal and an input to the non-inverting input terminal. By changing a duty cycle of the PWMDUTY signal, a drive signal from the RS latch 22 to the switching circuit (the output power MOS driver 23, the output power PMOS 24 and the output power NMOS 25) is controlled.

The RS latch 22 inputs the PWMDUTY signal from the PWM comparator in the reset terminal R thereof, and the periodic signal from the oscillator circuit 14 in the set terminal S thereof. The non-inverting output terminal Q of the RS latch is connected to the input of the output power MOS driver 23. The RS latch 22 outputs the drive signal of the output power MOS driver 23 from the non-inverting terminal Q based on an input to the reset terminal R and an input to the set terminal S. When the drive signal outputted from the non-inverting output terminal Q of the RS latch is at the high level, the output power MOS driver 23 turns on the gate terminal of the output power PMOS 24 and the gate terminal of the output power NMOS 25. Here, VIN is stored in the output coil 26. When the drive signal outputted from the non-inverting output terminal Q of the RS latch is at the low level, the output power MOS driver 23 turns off the gate terminal of the output power PMOS 24 and the gate terminal of the output power NMOS 25. Here, the energy stored in the output coil 26 is outputted to the output capacitor 27, and outputted to the latter stage as VOUT via the output capacitor 27.

In a case of a step-down type DC-DC converter, the slope of a ripple current in the output coil 26 is expressed by the following expression (2). It should be noted that in the following expression (2), dIripple/dt denotes the slope of the ripple current, VOUT denotes the output voltage value, and L denotes an inductor value of the coil.

$$dIripple/dt = VOUT/L \quad (2)$$

The slope compensation amount is required to be adjusted in accordance with the slope of the ripple current in order to perform proper slope compensation. As shown in the expression (2), in a case of the step-down type DC-DC converter, the slope of the ripple current may be a value proportional to VOUT. However, it is not necessarily required that the actual VOUT is fed back for determining the slope compensation amount. It is thought that VOUT is always constant after setting a set voltage value in the output voltage set register 10. Thus, when the slope compensation amount is set to be a fixed value in accordance with the value of VREF [6:0] being a value corresponding to VOUT, a sufficient slope compensation effect can be obtained.

In the present embodiment, the DAC for slope compensation 11 outputs VREFSLOPE in accordance with the upper 2 bits among 7 bits of VREF [6:0]. In order to change the slope compensation amount of VSLOPE in accordance with VREFSLOPE, the slope compensation circuit 13 changes the slope compensation amount of VSLOPE in accordance with the upper 2 bits among 7 bits of VREF [6:0]. With such a configuration, there is an effect of suppressing expansion of the circuit scale of the DAC for slope compensation 11. Otherwise, in a case of the output voltage set register 10 with a large number of bits (such as 7 bits), a circuit scale of the DAC for slope compensation 11 is unavoidably expanded in order to make the DAC for slope compensation 11 correspond to all the bits. In the DC-DC converter in the present embodiment, the DAC for slope compensation 11 and the slope compensation circuit 13 correspond only to a change of upper bits of VREF [6:0] largely changing the output voltage. Thus, sufficient stability of the slope compensation can be obtained and an increase of the circuit scale can be suppressed.

It should be noted that the present invention is not limited to the configuration that the DAC for slope compensation 11 and the slope compensation circuit 13 in the present embodiment correspond to upper 2 bits of VREF [6:0]. This is merely one example, and by making the DAC for slope compensation and the slope compensation circuit correspond to some upper bits of VREF [6:0], at least 1 bit, the same effect can be obtained. Further, the DAC for slope compensation and the slope compensation circuit may correspond to all the 7 bits of VREF [6:0]. Moreover, VREF [6:0] is not limited to the signal of 7 bits.

FIG. 3 is a diagram showing the slope compensation amount corresponding to upper 2 bits of VREF [6:0] in the present embodiment. In FIG. 3, the slope compensation amount is normalized to have a standard value "1" when VOUT is "1.3 V". Referring to FIG. 3, in a case where VREF [6:5] being the upper 2 bits of VREF [6:0] is "00", the slope compensation amount is "1" irrespective of the lower bits. When VREF [6:5] is "01", the slope compensation amount is "9/13" irrespective of the lower bits. Similarly, when VREF [6:5] is "10", the slope compensation amount is "5/13" irrespective of the lower bits. The values of the register, VOUT, and the values of the slope compensation amount in FIG. 3 are merely one example, and the present invention is not limited to this example.

Figure 4:
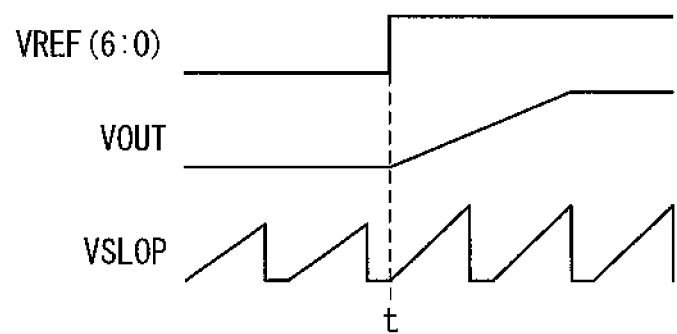
FIG. 4 is a diagram showing relationships between VOUT, VREF [6:0] and VSLOPE in the DC-DC converter in the present embodiment in a case where the output voltage VOUT is dynamically switched.

FIG. 4 is a diagram showing relationships between VOUT, VREF [6:0] and VSLOPE in the DC-DC converter in the present embodiment in a case where the output voltage VOUT is dynamically switched. Referring to FIG. 4, it can be recognized that when the value of the output voltage set register 10 is changed at time t in order to change VOUT, the slope compensation amount of VSLOPE is changed, and accordingly VOUT is gradually changed to a targeted voltage value. In a case where VOUT is set to be a high value, as shown in FIG. 3, a stable operation in which subharmonic oscillation is prevented can be realized by increasing the slope compensation amount. The operation of the DC-DC converter in the present embodiment is as described above.

As described in this specification, the DC-DC converter according to an embodiment of the present invention includes the output voltage set register 10 in place of a slope compensation value calculation circuit realized with an analogue circuit in the aforementioned conventional technique. The slope compensation circuit 13 switches the slope compensation amount in accordance with the value set in the output voltage set register 10, so that even upon dynamically switching the main voltage VOUT, a proper slope compensation can be realized. Thus, in the DC-DC converter of the above-described embodiment, by eliminating the slope compensation value calculation circuit of the analogue circuit, the DC-DC converter capable of realizing proper slope compensation at the time of dynamically changing the output voltage with low power consumption, high efficiency and a stable operation can be realized.

Although a step-down type DC-DC converter is described above as an example, the present invention is not limited to the step-down type but applicable to a step-up type or step-up/down type DC-DC converter.

The present invention is described above referring to some embodiments. However, the present invention is not limited to the embodiments. The configuration and detailed parts of the present invention can be variously modified within a scope of the present invention to be understood by those skilled in the art.

What is claimed is:

1. A DC-DC converter comprising:
a switching circuit configured to convert an input voltage value inputted to an input and being switched in response to a drive signal into an output voltage value being outputted to an output;
an error amplifier configured to generate an error signal based on an error between a target output voltage value to be outputted from the output and the output voltage value at the output;
a PWM comparator configured to generate a PWM signal based on the error signal, a current feedback signal corresponding to a current value between the input and the output, and a slope compensation signal to perform a slope compensation of the current value between the input and the output;
a latch circuit configured to generate the drive signal based on the PWM signal and a predetermined period signal;
an output voltage set register configured to record a set voltage value corresponding to the target output voltage value;
a slope compensation circuit configured to generate the slope compensation signal having a slope compensation amount corresponding to the set voltage value;
a first D/A converter configured to generate a slope compensation amount reference voltage being a voltage level corresponding to the set voltage value; and
a second D/A converter configured to generate a reference voltage being a voltage level corresponding to the set voltage value,
wherein the slope compensation circuit is configured to change the slope compensation amount of the slope compensation signal in response to the slope compensation amount reference voltage, and
the error amplifier is configured to generate the error signal by using the reference voltage as the target output voltage value.

2. The DC-DC converter according to claim 1, wherein the slope compensation circuit is configured to generate the slope compensation signal having the slope compensation amount corresponding to at least an upper 1 bit of the set voltage value.

3. The DC-DC converter according to claim 1, wherein the first D/A converter is configured to generate the slope compensation amount reference voltage being a voltage level corresponding to at least an upper 1 bit of the set voltage value.

4. A direct current voltage conversion method comprising:
converting an input voltage value inputted to an input and being switched in response to a drive signal into an output voltage value being outputted to an output;
generating an error signal based on an error between a target output voltage value to be outputted from the output and the output voltage value at the output;
generating a PWM signal based on the error signal, a current feedback signal corresponding to a current value between the input and the output, and a slope compensation signal to perform a slope compensation of the current value between the input and the output;
generating the drive signal based on the PWM signal and a predetermined period signal;
recording a set voltage value corresponding to the target output voltage value;
generating the slope compensation signal having a slope compensation amount corresponding to the set voltage value;
generating, with a first D/A converter, a slope compensation reference voltage being a voltage level corresponding to the set voltage value; and
generating, with a second D/A converter, a reference voltage being a voltage level corresponding to the set voltage value,
wherein the generating the slope compensation signal com
changing the slope compensation amount of the slope compensation signal in response to the slope compensation amount reference voltage, and
the generating the error signal comprises:
generating the error signal by using the reference voltage as the target output voltage value.

5. The direct current voltage conversion method according to claim 4, wherein the generating the slope compensation signal comprises:
generating the slope compensation signal having the slope compensation amount corresponding to at least an upper 1 bit of the set voltage value.

6. The direct current voltage conversion method according to claim 4, wherein the generating the slope compensation signal comprises:
generating the slope compensation amount reference voltage being a voltage level corresponding to at least an upper 1 bit of the set voltage value.

* * * * *

UNITED STATES PATENT AND TRADEMARK OFFICE
CERTIFICATE OF CORRECTION

| | |
|---|---|
| PATENT NO. | : 8,471,543 B2 |
| APPLICATION NO. | : 12/939580 |
| DATED | : June 25, 2013 |
| INVENTOR(S) | : Koichi Nakazono |

It is certified that error appears in the above-identified patent and that said Letters Patent is hereby corrected as shown below:

In the Claims

Column 8, Line 27: In Claim 4, before "reference" insert -- amount --

Column 8, Line 32: In Claim 4, delete "com" and insert -- comprises: --

Signed and Sealed this
Thirteenth Day of May, 2014

Michelle K. Lee
*Deputy Director of the United States Patent and Trademark Office*